United States Patent [19]
Takegahara et al.

[11] Patent Number: 5,940,365
[45] Date of Patent: Aug. 17, 1999

[54] AM DATA MULTIPLEXING MODULATION APPARATUS

[75] Inventors: Toshiyuki Takegahara, Tokyo; Shoichi Suzuki, Yokohama; Kenichi Shiraishi, Yokohama; Hiroyuki Nagasaka, Yokohama; Ryuichi Okazaki, Machida; Atsushi Shinoda, Sagamihara, all of Japan

[73] Assignee: Kabushiki Kaisha Kenwood, Tokyo, Japan

[21] Appl. No.: 08/870,016

[22] Filed: Jun. 5, 1997

[30] Foreign Application Priority Data

Jun. 7, 1996 [JP] Japan .................................. 8-166636

[51] Int. Cl.⁶ .................................................. H04J 11/00
[52] U.S. Cl. ............................................................ 370/208
[58] Field of Search ..................................... 370/203, 204, 370/205, 481, 482, 480, 206, 207, 208, 209; 375/268, 269

[56] References Cited

U.S. PATENT DOCUMENTS

| | | | |
|---|---|---|---|
| 5,418,815 | 5/1995 | Ishikawa et al. | 375/216 |
| 5,461,426 | 10/1995 | Limberg et al. | 348/475 |
| 5,521,943 | 5/1996 | Dambacher | 375/295 |
| 5,555,016 | 9/1996 | Rhodes et al. | 348/6 |
| 5,588,022 | 12/1996 | Dapper et al. | 375/216 |
| 5,764,706 | 6/1998 | Carlin et al. | 375/326 |
| 5,825,807 | 10/1998 | Kumar | 375/200 |

*Primary Examiner*—Ajit Patel
*Assistant Examiner*—Brian Nguyen
*Attorney, Agent, or Firm*—Sixbey, Friedman, Leedom & Ferguson, P.C.; Eric J. Robinson

[57] ABSTRACT

An AM data multiplexing modulation apparatus for multiplexing a digital signal to an AM modulation signal without adversely affecting an AM sync detection output even if AM sync detection is performed. An AM modulator AM modulates a carrier having a frequency fc by an input signal, an orthogonal modulator 3 orthogonally modulates a carrier having a frequency (fc+fα) by a QPSK baseband digital signal generated by a QPSK baseband digital signal generator 2, a sign inverter and a complex conjugate unit change the sign of a signal having the same phase as a reference carrier of vector shift and corresponding to a dibit formed by the QPSK baseband digital signal generated by the QPSK baseband digital signal generator, another orthogonal modulator orthogonally modulates a carrier having a frequency (fc−fα) by an output of the complex conjugate unit, the outputs of the two orthogonal modulators are added by an adder, this addition result is added to the output of the AM modulator by another adder which outputs an AM data multiplexing modulation output.

6 Claims, 7 Drawing Sheets

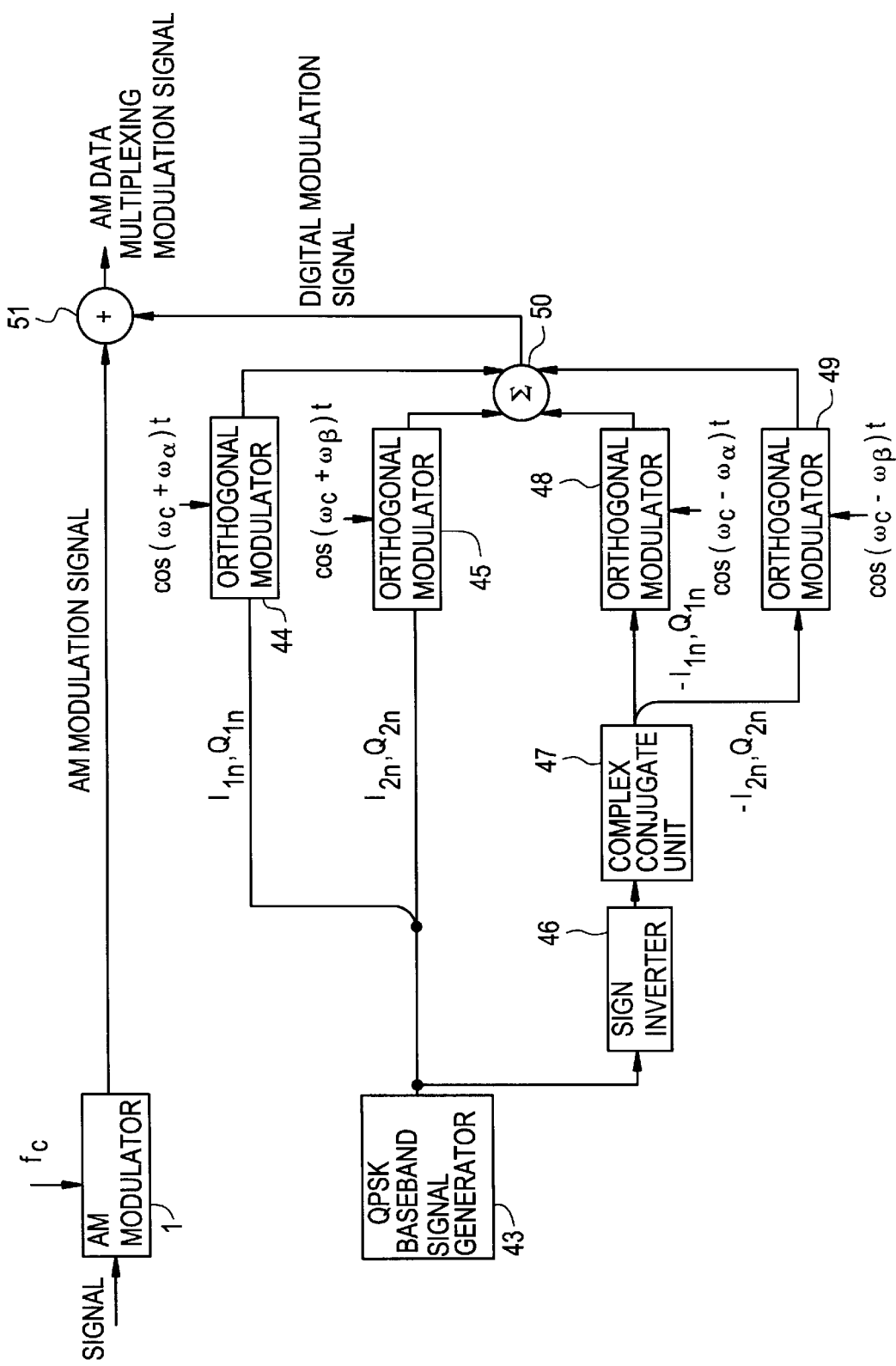

5,940,365

AM DATA MULTIPLEXING MODULATION APPARATUS

BACKGROUND OF THE INVENTION

1. Field of the Invention

The present invention relates to an AM data multiplexing modulation apparatus for multiplexing a digital signal to an AM modulation signal and transmitting it.

2. Description of the Related Art

A conventional data multiplexing system is broadly classified into a time division multiplex system used for character multiplex broadcasting of TV broadcasting and a frequency division multiplex system used for character multiplex broadcasting of FM broadcasting. AM broadcasting has a narrow occupied bandwidth and cannot be used for frequency division multiplex and time division multiplex. AM data multiplexing modulation apparatus for multiplexing a digital signal to an AM modulation signal is not used as yet, although data multiplex broadcasting such as TV broadcast and FM broadcast are presently used.

SUMMARY OF THE INVENTION

It is an object of the present invention to provide an AM data multiplexing modulation apparatus for multiplexing a digital signal to an AM modulation signal without adversely affecting an AM sync detection output during AM sync detection.

An AM data multiplexing modulation apparatus of this invention comprises: an AM modulator for AM modulating a carrier having a frequency of fc by an analog signal; a first modulator for modulating a carrier having a frequency of (fc+fα) by a baseband digital signal generated by a baseband digital signal generator; a sign inverter for inverting a sign of the baseband digital signal generated by the baseband digital signal generator; a second modulator for modulating a carrier having a frequency of (fc−fα) by an output signal from the sign inverter; a first adder for adding an output signal from the first modulator to an output signal from the second modulator; and a second adder for adding an output signal from the AM modulator to an output signal from the first adder.

In the AM data multiplexing modulation apparatus of this invention, the digital modulation signals are multiplexed symmetrically with an AM carrier fc along its frequency axis, at the frequencies of (fc+fα) and (fc−fα). Therefore, an AM sync detection output is not affected even if an AM data multiplexing modulation signal is AM sync detected.

An AM data multiplexing modulation apparatus of this invention comprises: an AM modulator for AM modulating a carrier having a frequency of fc by an analog signal; a first balanced modulator for modulating a carrier having a frequency of (fc+fα) by an ASK baseband digital signal generated by an ASK baseband digital signal generator; a sign inverter for inverting a sign of the ASK baseband digital signal generated by the ASK baseband digital signal generator; a second balanced modulator for modulating a carrier having a frequency of (fc−fα) by an output signal from the sign inverter; a first adder for adding an output signal from the first balanced modulator to an output signal from the second balanced modulator; and a second adder for adding an output signal from the AM modulator to an output signal from the first adder.

In the AM data multiplexing modulation apparatus of this invention, the ASK digital modulation signals are multiplexed symmetrically with an AM carrier fc along its frequency axis, at the frequencies of (fc+fα) and (fc−fα). Therefore, an AM sync detection output is not affected even if an AM data multiplexing modulation signal is AM sync detected.

An AM data multiplexing modulation apparatus of this invention comprises: an AM modulator for AM modulating a carrier having a frequency of fc by an analog signal; a first orthogonal modulator for orthogonally modulating a carrier having a frequency of (fc+fα) by a four-phase PSK baseband digital signal generated by a four-phase PSK baseband digital signal generator; a sign inverter for inverting the sign of a signal having the same phase as a reference carrier phase of vector shift and corresponding to a dibit formed by the four-phase PSK baseband digital signal generated by the four-phase PSK baseband digital signal generator; a second orthogonal modulator for orthogonally modulating a carrier having a frequency of (fc−fα) by an output signal from the sign inverter; a first adder for adding an output signal from the first orthogonal modulator to an output signal from the second orthogonal modulator; and a second adder for adding an output signal from the AM modulator to an output signal from the first adder.

In the AM data multiplexing modulation apparatus of this invention, the four-phase PSK digital modulation signals are multiplexed symmetrically with an AM carrier fc along its frequency axis, at the frequencies of (fc+fα) and (fc−fα). Therefore, an AM sync detection output is not affected even if an AM data multiplexing modulation signal is AM sync detected.

An AM data multiplexing modulation apparatus of this invention comprises: an AM modulator for AM modulating a carrier having a frequency of fc by an analog signal; a first modulator for orthogonally modulating a carrier having a frequency of (fc+fα) by 2 bits (an, bn) of a multi-phase (8-phase or more) PSK baseband digital signal (an, bn, cn, dn, . . . ) generated by a multi-phase PSK baseband digital signal generator, the phase of the carrier being controlled in accordance with a baseband digital signal (cn, dn, . . . ) of the third and higher bits of the multi-phase PSK baseband digital signal; a sign inverter for inverting the sign of the multi-phase PSK baseband digital signal (an, bn, cn, dn, . . . ) generated by the multi-phase PSK baseband digital signal generator; a complex conjugate unit for changing a dibit (−an, −bn) of two bits of the multi-phase PSK baseband digital signal with the sign thereof being inverted by the sign inverter, to a complex conjugate digital signal (−an, bn); a second modulator for orthogonally modulating a carrier having a frequency of (fc−fα) by the complex conjugate digital signal (−an, bn) changed by the complex conjugate unit, the phase of the carrier being controlled in accordance with a baseband digital signal (−cn, −dn, . . . ) of the third and higher bits of the multi-phase PSK baseband digital signal with the sign thereof being inverted by the sign inverter; a first adder for adding an output signal from the first modulator to an output signal from the second modulator; and a second adder for adding an output signal from the AM modulator to an output signal from the first adder.

In the AM data multiplexing modulation apparatus of this invention, the multi-phase (8-phase or more) digital modulation signals are multiplexed symmetrically with an AM carrier fc along its frequency axis, at the frequencies of (fc+fα) and (fc−fα). Therefore, an AM sync detection output is not affected even if an AM data multiplexing modulation signal is AM sync detected.

An AM data multiplexing modulation apparatus of this invention comprises: an AM modulator for AM modulating a carrier having a frequency of fc by an analog signal; a first modulator for FSK modulating a carrier having a frequency of (fc+fα+Δf) and a carrier having a frequency of (fc+fα-Δf) by an FSK baseband digital signal generated by an FSK baseband digital signal generator; a sign inverter for inverting the sign of the FSK baseband digital signal generated by the FSK baseband digital signal generator; a second modulator for FSK modulating a carrier having a frequency of (fc-fα+Δf) and a carrier having a frequency of (fc-fα-Δf) by an output from the sign inverter; a first adder for adding an output signal from the first modulator to an output signal from the second modulator; and a second adder for adding an output signal from the AM modulator to an output signal from the first adder.

In the AM data multiplexing modulation apparatus of this invention, the FSK digital modulation signals are multiplexed symmetrically with an AM carrier fc along its frequency axis, at the frequencies of (fc+fα) and (fc-fα). Therefore, an AM sync detection output is not affected even if an AM data multiplexing modulation signal is AM sync detected.

An AM data multiplexing modulation apparatus of this invention comprises: an AM modulator for AM modulating a carrier having a frequency of fc by an analog signal; a first orthogonal modulator for orthogonally modulating carriers having frequencies of (fc+fn), where n is a natural number, by a four-phase PSK baseband digital signal generated by a four-phase PSK baseband digital signal generator; a sign inverter for inverting the sign of a signal having the same phase as a reference carrier phase of vector shift and corresponding to a dibit formed by the four-phase PSK baseband digital signal generated by the four-phase PSK baseband digital signal generator; a first orthogonal modulator for orthogonally modulating carriers having frequencies of (fc-fn), where n is a natural number, by an output from the sign inverter; a first adder for adding an output signal from the first orthogonal modulator to an output signal from the second orthogonal modulator; and a second adder for adding an output signal from the AM modulator to an output signal from the first adder.

In the AM data multiplexing modulation apparatus of this invention, the four-phase PSK digital modulation signals are multiplexed symmetrically with an AM carrier fc along its frequency axis, at the frequencies of (fc+fα) and (fc-fα). Therefore, an AM sync detection output is not affected even if an AM data multiplexing modulation signal is AM sync detected.

BRIEF DESCRIPTION OF THE DRAWINGS

FIG. 7 is a block diagram showing the structure of an AM data multiplexing modulation apparatus according to a fifth modification of the embodiment of the invention.

DETAILED DESCRIPTION OF THE PREFERRED EMBODIMENTS

Embodiments of an AM data multiplexing modulator apparatus of this invention will be described.

Figure 1:
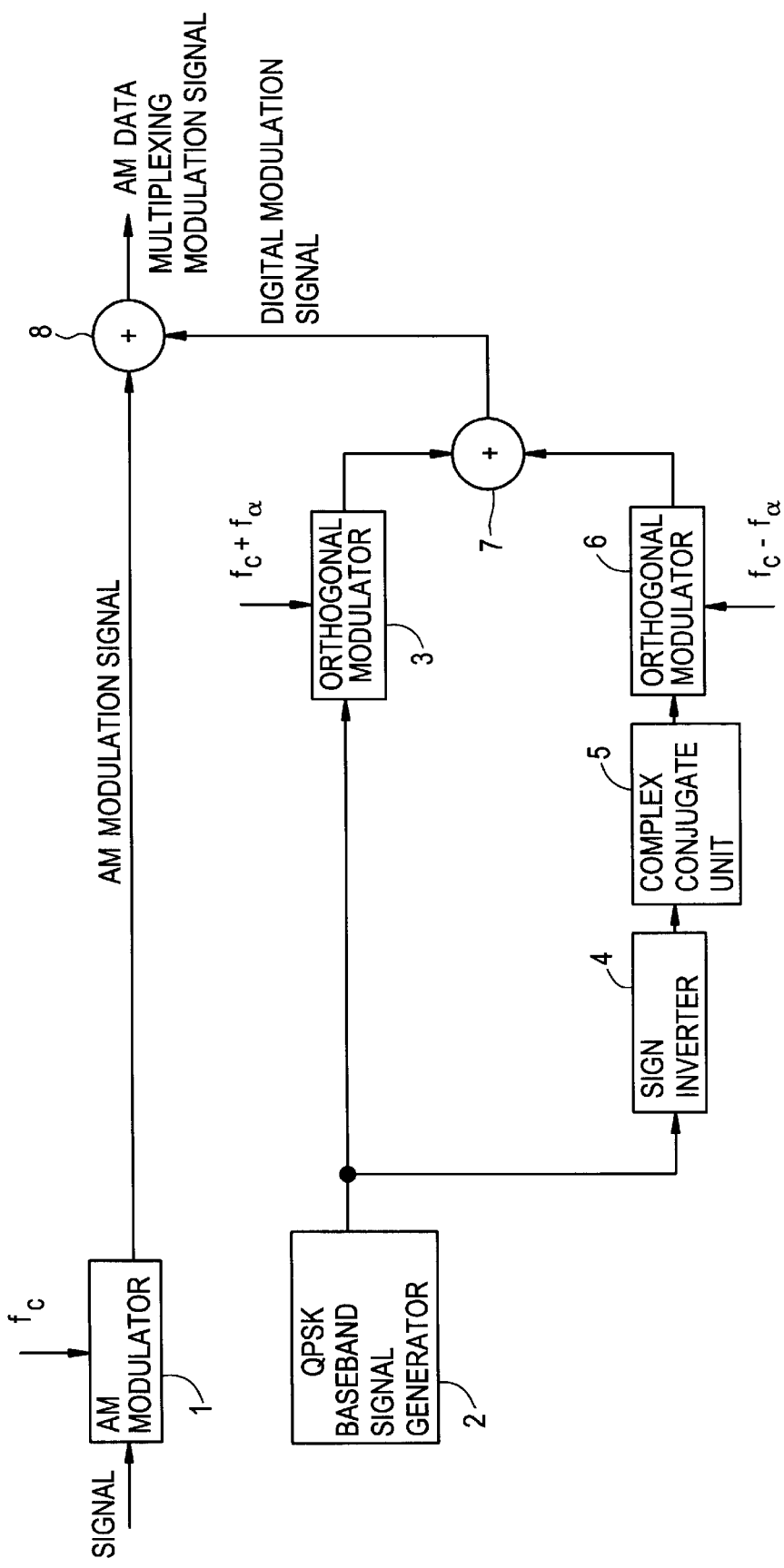
FIG. 1 is a block diagram showing the structure of an AM data multiplexing modulation apparatus according to an embodiment of the invention.

FIG. 1 is a block diagram showing the structure of an AM data multiplexing modulation apparatus according to an embodiment of the invention. The AM data multiplexing modulation apparatus of the embodiment of this invention shown in FIG. 1 is one example wherein a QPSK (quadrature phase (4-phase) shift keying) modulation is used as digital modulation.

An analog signal wave (hereinafter simply called a signal where applicable) such as voice signal is supplied to an AM modulator 1 to AM modulate a carrier having a frequency fc by the analog signal. A QPSK baseband digital signal generated from a QPSK baseband digital signal generator 2 is supplied to an orthogonal modulator 3 to orthogonally modulate a carrier having a frequency of (fc+fα) by the QPSK baseband digital signal. The QPSK baseband digital signal generated from the QPSK baseband digital signal generator 2 is also supplied to a sign inverter 4 to invert the sign of the signal.

The QPSK baseband digital signal whose sign was inverted by the sign inverter 4 is supplied to a complex conjugate unit 5 to convert the signal into a complex conjugate signal. The sign of a QN signal train of the QPSK baseband digital signal input to the complex conjugate unit 5 is inverted. Namely, the sign inverter 4 and complex conjugate unit 5 invert the sign of a signal having the same phase as the reference carrier phase of a vector shift and corresponding to a dibit formed by the QPSK baseband digital signal. Therefore, in place of the sign inverter 4 and complex conjugate unit 5, a single sign inverter which can invert the signs of the In signal train of the QPSK baseband digital signal.

An output signal of the complex conjugate unit 5 is supplied to an orthogonal modulator 6 to orthogonally modulate a carrier having a frequency of (fc-fα) by an output signal from the complex conjugate unit 5. An output signal from the orthogonal modulator 3 and an output signal from the orthogonal modulator 6 are supplied to an adder 7 and added together. An output signal from the adder 7 and an AM modulation signal from the AM modulator 1 are supplied to an adder 8 and added together. This addition signal from the adder 8 is transmitted as an AM data multiplexed modulation signal.

Figure 2:
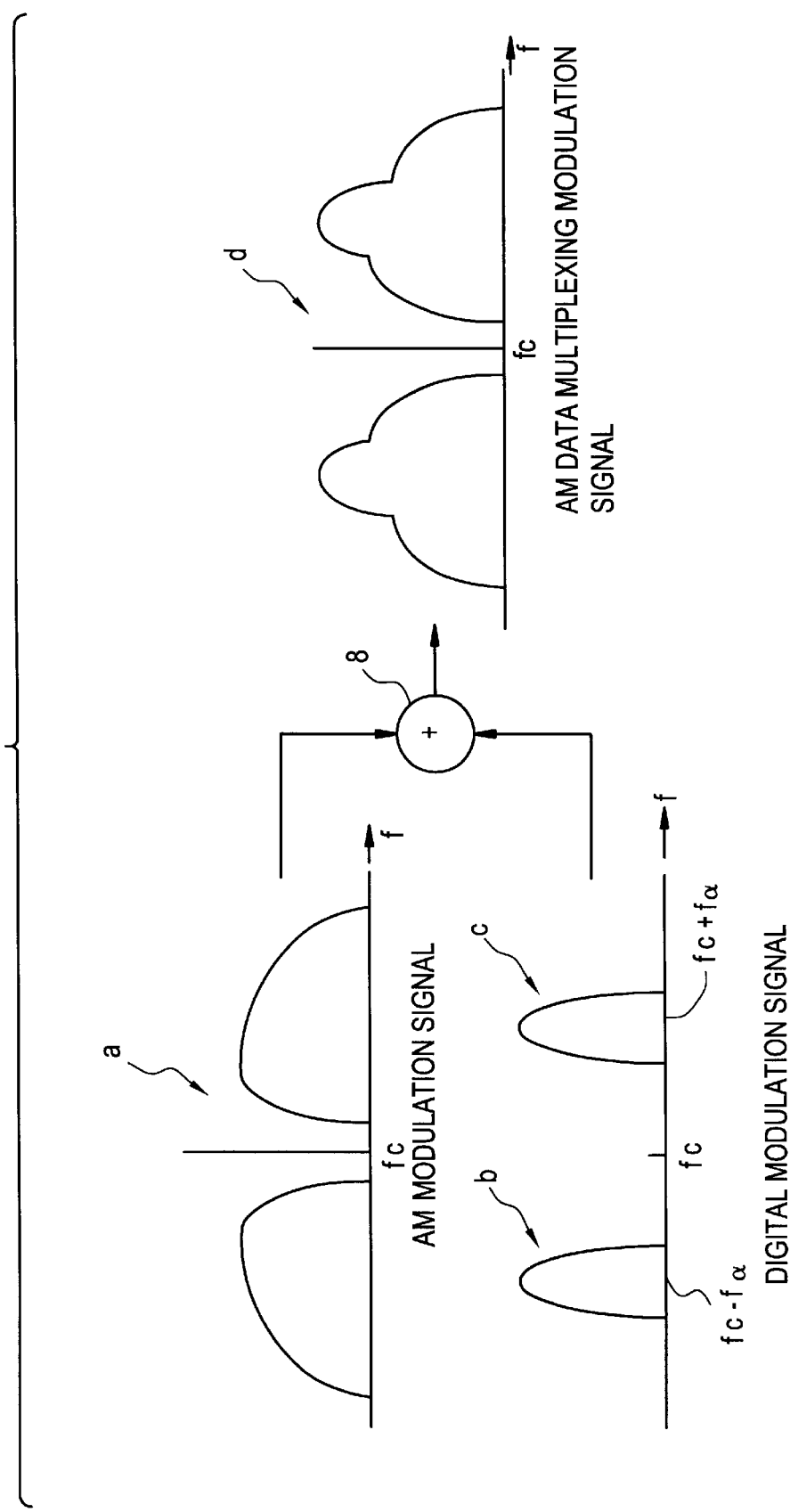
FIG. 2 is a schematic diagram illustrating the operation of the AM data multiplexing modulation apparatus of the embodiment.

An AM data multiplexed modulation process to be executed by the AM data multiplexed modulation apparatus of this embodiment of the invention constructed as above is schematically illustrated in FIG. 2. In FIG. 2, an AM modulation signal output from the AM modulator 1 is indicated at a in FIG. 2. An output signal from the orthogonal modulator 6, i.e., a digital modulation signal, is indicated at b in FIG. 2. An output signal from the orthogonal modulator 3, i.e., a digital modulation signal, is indicated at c in FIG. 2. A digital modulation signal output from the adder 7 is a sum of the signals b and c shown in FIG. 2. An AM multiplexed modulation signal output from the adder 8 is indicated at d in FIG. 2.

An AM data multiplexed modulation process to be executed by the AM data multiplexed modulation apparatus of this embodiment of the invention will be described.

An AM modulation signal υAM(t) output from the AM modulator is given by the following equation (1), where the amplitude of the carrier is 1, an angular frequency of the carrier is ωc (rad/s), the modulation factor is κ, and the input signal is υm(t).

$$\upsilon AM(t) = \{1 + \kappa \upsilon m(t)\} \cos \omega ct \quad (1)$$

I and Q digital signals generated by the QPSK baseband digital signal generator 2 are represented by In and Qn. The digital signal train of In and Qn is called a dibit where applicable. In and Qn are represented by:

In=+/−1

Qn=+/−1

An output signal of the QPSK baseband digital signal generator 2 is supplied to two circuit paths. One signal is input to the orthogonal modulator 3 to which the carrier having the frequency of (fc+fα) is input. The orthogonal modulator 3 orthogonally modulates the carrier having an angular frequency of (ωc+ωα) by a corresponding complex signal train. An output signal υDH(t) from the orthogonal modulator 3 is given by the following equation (2).

$$\upsilon DH(t) = In \cos(\omega c + \omega \alpha)t + Qn \sin(\omega c + \omega \alpha)t \quad (2)$$

The other output signal from the QPSK baseband digital signal generator 2 is supplied to the sign inverter 4 which inverts the signs of the output signals In and Qn to (−In) and (−Qn), and the complex conjugate unit 5 forms complex conjugate to convert them into (−In) and (Qn). This complex signal train is input to the orthogonal modulator 6 to which the carrier having the frequency of (fc−fα) is input. The orthogonal modulator 6 orthogonally modulates the carrier having an angular frequency of (ωc−ωα) by the complex signal train. An output signal υDL(t) from the orthogonal modulator 6 is given by the following equation (3).

$$\upsilon DL(t) = -In \cos(\omega c - \omega \alpha)t + Qn \sin(\omega c - \omega \alpha)t \quad (3)$$

The output signals υDH(t) and υDL(t) of the equations (2) and (3) are input to the adder 7 and added together. The addition output or digital modulation signal υD(t) is given by the following equation (4).

$$\begin{aligned}\upsilon D(t) &= \upsilon DH(t) + \upsilon DL(t) \\ &= In \cos(\omega c + \omega a)t + Qn \sin(\omega c + \omega a)t - \\ &\quad In \cos(\omega c - \omega a)t + Qn \sin(\omega c - \omega a)t\end{aligned} \quad (4)$$

The AM modulation signal υAM(t) and digital modulation signal υD(t) are input to the adder 8 and added together. The AM data multiplexing modulation signal υ(t) is given from the equations (1) and (4) by the following equation (5).

$$\begin{aligned}\upsilon(t) &= \upsilon AM(t) + \upsilon D(t) \\ &= \{1 + \kappa \upsilon m(t)\} \cos \omega ct + \\ &\quad In \cos(\omega c + \omega a)t + Qn \sin(\omega c + \omega a)t - \\ &\quad In \cos(\omega c - \omega a)t + Qn \sin(\omega c - \omega a)t\end{aligned} \quad (5)$$

An AM sync detection of the AM data multiplexing modulation signal modulated in the above manner will be described.

For the sync detection, the carrier cos ωct is multiplied by the equation (5) to obtain the following equation.

$$\begin{aligned}2\{\upsilon(t)\cos \omega ct\} = &\{1 + \kappa \upsilon m(t)\} + In \cos \omega at + Qn \sin \omega at - \\ &In \cos(-\omega a)t + Qn \sin(-\omega a)t + \\ &\{1 + \kappa \upsilon m(t)\}\cos 2\omega ct + In \cos(2\omega c + \omega a)t + \\ &Qn \sin(2\omega c + \omega a)t - In \cos(2\omega c - \omega a)t + \\ &Qn \sin(2\omega c - \omega a)t\end{aligned}$$

An AM sync detector has a low-pass filter so that the high frequency components are removed and the result is given by the following equation (6).

$$\begin{aligned}2\{\upsilon(t)\cos \omega ct\} &= \{1 + \kappa \upsilon m(t)\} + In \cos \omega at + Qn \sin \omega at - \quad (6)\\ &\quad In \cos(-\omega a)t + Qn \sin(-\omega a)t \\ &= \{1 + \kappa \upsilon m(t)\} + In \cos \omega at + Qn \sin \omega at - \\ &\quad In \cos \omega at - Qn \sin \omega at \\ &= \{1 + \kappa \upsilon m(t)\}\end{aligned}$$

As apparent from the equation (6), the digital modulation components are cancelled out. Therefore, after the dc components of the equation (6) are cut, the resultant signal is amplified to recover the input signal υm(t) before the modulation by the AM data multiplexing modulation apparatus of this embodiment of the invention. It can be therefore understood that an AM sync detection output is not affected even if an AM data multiplexing modulation signal modulated by the AM data multiplexing modulation apparatus of the embodiment of the invention is AM sync detected.

In FIG. 1, the QPSK baseband digital signal generator 2 may use other modulation methods such as PSK, AKD, QAM, FSK, and MSK. Although two digital modulation carriers having the frequency of (fc+fα) and (fc−fα) are used, three or more digital modulation carriers may be used such as multi-carriers, frequency hopping, and OFDM.

Next, an AM data multiplexing modulation apparatus according to a first modification of the embodiment of the invention will be described.

Figure 3:
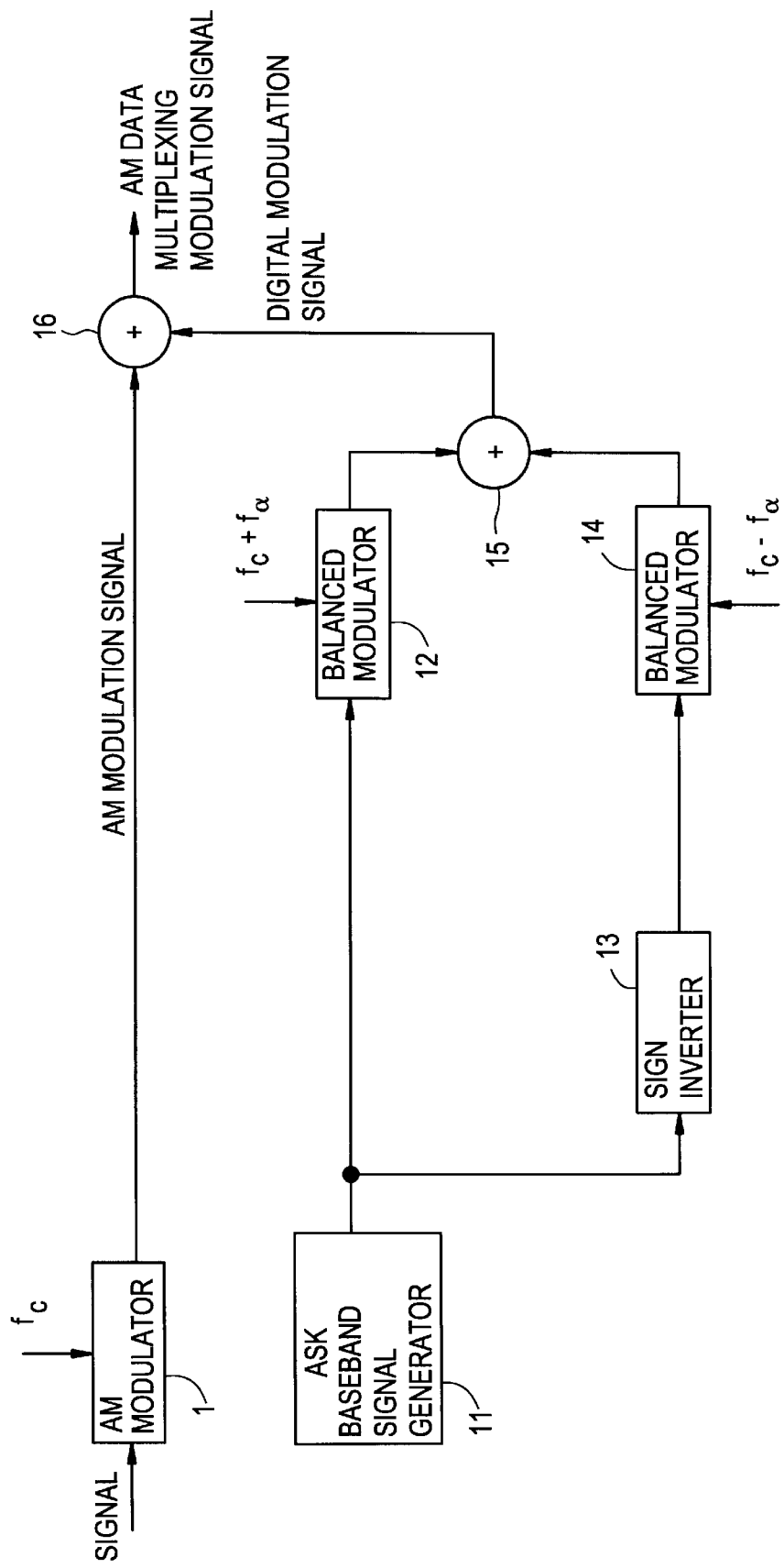
FIG. 3 is a block diagram showing the structure of an AM data multiplexing modulation apparatus according to a first modification of the embodiment of the invention.

FIG. 3 is a block diagram showing the structure of an AM data multiplexing modulation apparatus according to the first modification of the embodiment of the invention. The AM data multiplexing modulation apparatus of the first modification of the embodiment of this invention shown in FIG. 3 is one example wherein an ASK (amplitude shift keying) modulation is used as digital modulation.

In the AM data multiplexing modulation apparatus of the first modification, an analog signal is supplied to an AM modulator 1 to AM modulate a carrier having a frequency fc by the analog signal. An ASK baseband digital signal generated from an ASK baseband digital signal generator 11 is supplied to a balanced modulator 12 to balance-modulate a carrier having a frequency of (fc+fα) by the ASK baseband digital signal. The ASK baseband digital signal generated from the ASK baseband digital signal generator 11 is also supplied to a sign inverter 13 to invert the sign of the signal. The ASK baseband digital signal whose sign was inverted by the sign inverter 13 is supplied to a balanced modulator 14 to balance-modulate a carrier having a frequency of (fc−fα) by an output signal from the sign inverter 13. An output signal from the balanced modulator 12 and an output signal from the balanced modulator 14 are supplied to an adder 15 and added together. An output signal from the adder 15 and an AM modulation signal from the AM modulator 1 are supplied to an adder 16 and added together.

This addition signal from the adder 16 is transmitted as an AM data multiplexed modulation signal.

An AM data multiplexed modulation process to be executed by the AM data multiplexed modulation apparatus of the first modification of the embodiment of the invention constructed as above will be described.

An AM modulation signal υAM(t) output from the AM modulator is given by the following equation (7), where the amplitude of the carrier is 1, an angular frequency of the carrier is ωc (rad/s), the modulation factor is κ, and the input signal is υm(t).

$$vAM(t) = \{1 + \kappa vm(t)\} \cos \omega ct \quad (7)$$

A signal train generated by the ASK baseband digital signal generator 11 is represented by an which is given by:

an=0 or 1

This signal train is supplied to two circuit paths. One signal is input to the balanced modulator 12 to which the carrier having the frequency of (fc+fα) is input, and modulates a carrier of cos (ωc+ωα). An output signal υDH(t) from the balanced modulator 12 is given by the following equation (8).

$$vDH(t) = an \cos(\omega c + \omega \alpha)t \quad (8)$$

The other output signal train an is supplied to the sign inverter 13 which inverts the sign of the signal train to (−an). This signal train is input to the balanced modulator 14 to which the carrier having the frequency of (fc−fα) is input, and modulates the carrier cos (ωc−ωα). An output signal υDL(t) from the balanced modulator 14 is given by the following equation (9).

$$vDL(t) = -an \cos(\omega c - \omega \alpha)t \quad (9)$$

The AM modulated signals υDH(t) and υDL(t) are input to the adder 15 and added together. The addition output or digital modulation signal υD(t) is given by the following equation (10).

$$\begin{aligned} vD(t) &= vDH(t) + vDL(t) \quad (10)\\ &= \underline{an} \cos 2(\omega c + \omega a)t - \underline{an} \cos(\omega c - \omega a)t \end{aligned}$$

The AM modulated signal υAM (t) and digital modulated signal υD(t) are input to the adder 16 and added together. The AM data multiplexed modulation signal υ(t) is given by the following equation (11).

$$\begin{aligned} v(t) &= vAM(t) + vD(t) \quad (11)\\ &= \{1 + \kappa vm(t)\} \cos \omega ct + \underline{an} \cos(\omega c + \omega a)t -\\ &\quad \underline{an} \cos(\omega c - \omega a)t \end{aligned}$$

Next, an AM sync detection of the AM data multiplexing modulation signal (in the case of ASK modulation) modulated in the above manner will be described.

For the AM sync detection, the AM carrier cos ωct is multiplied by the equation (11) to obtain the following equation (12).

$$\begin{aligned} 2\{v(t)\cos\omega ct\} &= \{1 + \kappa vm(t)\} + \underline{an}\cos\omega at - \underline{an}\cos(-\omega a)t + \quad (12)\\ &\quad \{1 + \kappa vm(t)\}\cos 2\omega ct + \underline{an}\cos(2\omega c + \omega a)t -\\ &\quad \underline{an}\cos(2\omega c - \omega a)t \end{aligned}$$

The low-pass filer of the AM sync detector cuts the high frequency components and the result is given by the following equation (13).

$$\begin{aligned} 2\{v(t)\cos\omega ct\} &= \{1 + \kappa vm(t)\} + \underline{an}\cos\omega at - \underline{an}\cos(-\omega a)t \quad (13)\\ &= \{1 + \kappa vm(t)\} + \underline{an}\cos\omega at - \underline{an}\cos\omega at\\ &= 1 + \kappa vm(t) \end{aligned}$$

As above, since the digital modulation components are cancelled out, after the dc components of the equation (13) are cut, the resultant signal is amplified to recover the input signal υm(t) before the modulation by the AM data modulator 1. It can be therefore understood that an AM sync detection output is not affected even if an AM data multiplexing modulation signal modulated by the AM data multiplexing modulation apparatus of the first modification of the embodiment of the invention is AM sync detected.

Next, an AM data multiplexing modulation apparatus according to a second modification of the embodiment of the invention will be described.

Figure 4:
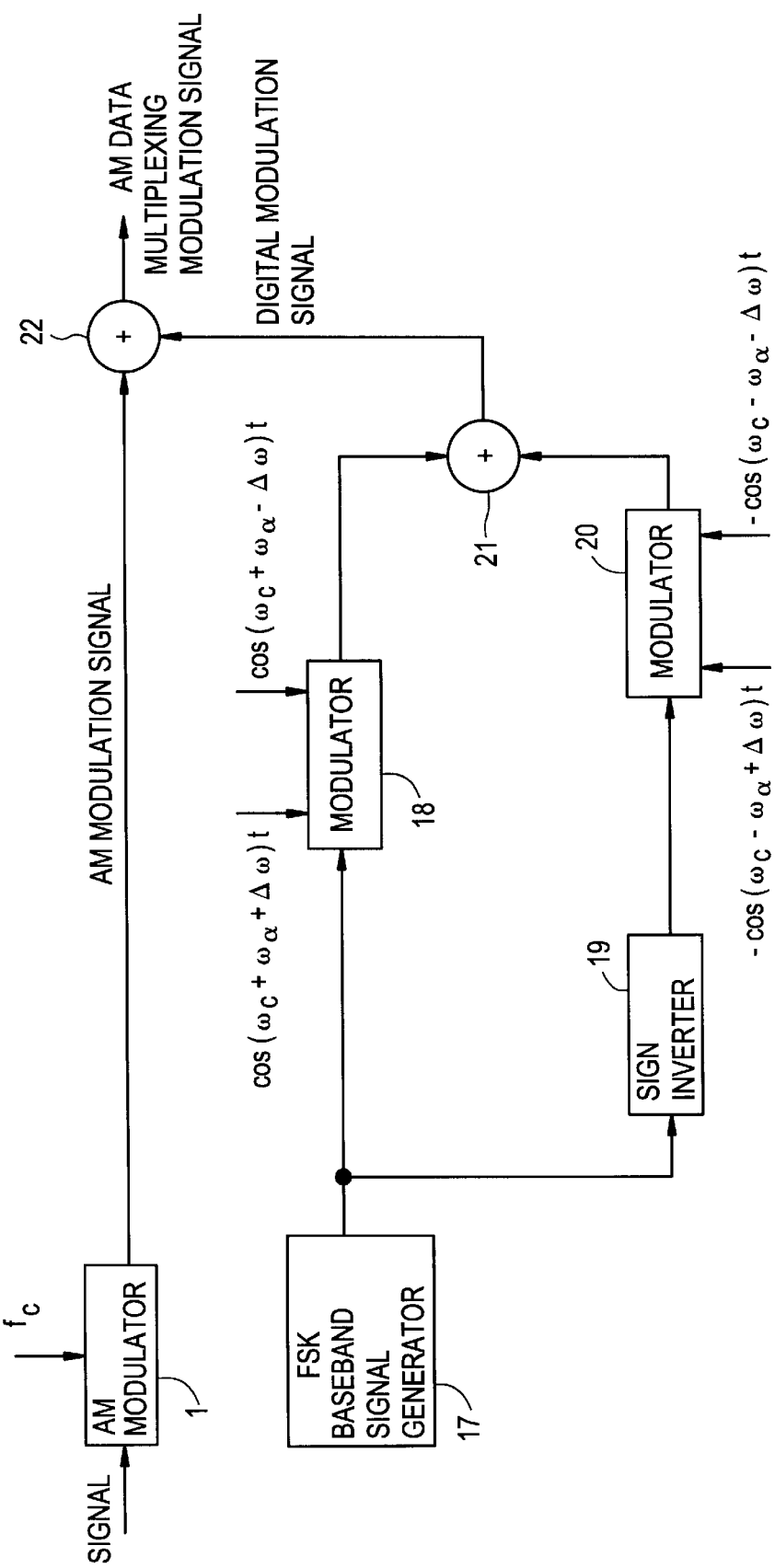
FIG. 4 is a block diagram showing the structure of an AM data multiplexing modulation apparatus according to a second modification of the embodiment of the invention.

FIG. 4 is a block diagram showing the structure of an AM data multiplexing modulation apparatus according to the second modification of the embodiment of the invention. The AM data multiplexing modulation apparatus of the second modification of the embodiment of this invention shown in FIG. 4 is one example wherein an FSK (frequency shift keying) modulation is used as digital modulation.

In the AM data multiplexing modulation apparatus of the second modification, an analog signal is supplied to an AM modulator 1 to AM modulate a carrier having a frequency fc by the analog signal. An FSK baseband digital signal generated from an FSK baseband digital signal generator 17 is supplied to a modulator 18 to FSK modulate carriers cos (ωc+ωα+Δω)t and cos (ωc+ωα−Δω)t by the FSK baseband digital signal. The FSK baseband digital signal generated from the FSK baseband digital signal generator 17 is also supplied to a sign inverter 19 to invert the sign of the signal.

The FSK baseband digital signal whose sign was inverted by the sign inverter 19 is supplied to a modulator 20 to FSK modulate carriers −cos (ωc−ωα+Δω)t and −cos (ωc−ωα−Δω)t by the FSK baseband digital signal output from the sign inverter 19. An output signal from the modulator 18 and an output signal from ther modulator 20 are supplied to and adder 21 and added together. An output signal from the adder 21 and an AM modulation signal from the AM modulator 1 are supplied to an adder 22 and added together. This addition signal from the adder 22 is transmitted as an AM data multiplexed modulation signal.

An AM data multiplexed modulation process to be executed by the AM data multiplexed modulation apparatus of the second modification of the embodiment of the invention constructed as above will be described.

The process of generating an AM data multiplexed modulation signal by the AM data multiplexed modulation apparatus of the second modification of the embodiment of the invention shown in FIG. 4 will be described.

An AM modulation signal vAM(t) output from the AM modulator is given by the following equation (14), where the amplitude of the carrier is 1, an angular frequency of the carrier is ωc (rad/s), the modulation factor is κ, and the input signal is υm(t).

$$\upsilon AM(t) = \{1 + \kappa \upsilon m(t)\} \cos \upsilon ct \quad (14)$$

A signal train generated by the FSK baseband digital signal generator 17 is represented by an which is given by:

an=0 or 1

This signal train an is supplied to two circuit paths. One signal is input to the modulator 18 to modulate the carrier cos (ωc+ωα+/−Δω)t. An output signal υDH(t) from the modulator 18 is given by the following equation (15) where Δω ia an angular frequency shift amount (rad/s).

$$\upsilon DH(t) = \cos(\omega c + \omega\alpha + \Delta\omega an)t \quad (15)$$

The other output signal train an is supplied to the sign inverter 19 which inverts the sign of the signal train to (−an). This signal train is input to the modulator 20 to modulate the carrier −cos (ωc−ωα+/−Δω)t. An output signal υDL(t) from the modulator 20 is given by the following equation (16).

$$\upsilon DL(t) = -\cos(\omega c - \omega\alpha - \Delta\omega an)t \quad (16)$$

The signals υDH(t) and υDL(t) are input to the adder 21 and added together. The addition output or digital modulation signal υD(t) is given by the following equation (17).

$$\begin{aligned}\upsilon D(t) &= \upsilon DH(t) + \upsilon DL(t) \\ &= \cos(\omega c + \omega a + \Delta\omega \underline{an})t - \cos(\omega c - \omega a - \Delta\omega \underline{an})t\end{aligned} \quad (17)$$

The AM modulated signal υAM (t) and digital modulated signal υD(t) are input to the adder 22 and added together. The AM data multiplexed modulation signal υ(t) is given by the following equation (18).

$$\begin{aligned}\upsilon(t) &= \upsilon AM(t) + \upsilon D(t)) \\ &= \{1 + \kappa\upsilon m(t)\}\cos\omega ct + \cos(\omega c + \omega a + \Delta\omega\underline{an})t - \\ &\quad \cos(\omega c - \omega a - \Delta\omega\underline{an})t\end{aligned} \quad (18)$$

Next, an AM sync detection of the AM data multiplexing modulation signal (in the case of FSK modulation) modulated in the above manner will be described.

For the AM sync detection, the AM carrier cos ωct is multiplied by the equation (18) to obtain the following equation (19).

$$\begin{aligned}2\{\upsilon(t)\cos\omega ct\} &= \{1 + \kappa\upsilon m(t)\} + \cos(\Delta\omega\underline{an} + \omega a)t - \\ &\quad \cos(-\Delta\omega\underline{an} - \omega a)t + \{1 + \kappa\upsilon m(t)\} + \\ &\quad \cos 2\omega ct + \cos(2\omega c + \Delta\omega\underline{an} + \omega a)t - \\ &\quad \cos(2\omega c - \Delta\omega\underline{an} - \omega a)t\end{aligned} \quad (19)$$

The low-pass filer of the AM sync detector cuts the high frequency components and the result is given by the following equation (20).

$$\begin{aligned}2\{\upsilon(t)\cos\omega ct\} &= \{1 + \kappa\upsilon m(t)\} + \cos(\Delta\omega\underline{an} + \omega a)t - \\ &\quad \cos(-\Delta\omega\underline{an} - \omega a)t \\ &= \{1 + \kappa\upsilon m(t)\} + \cos(\Delta\omega\underline{an} + \omega a)t - \\ &\quad \cos(\Delta\omega\underline{an} + \omega a)t \\ &= 1 + \kappa\upsilon m(t)\end{aligned} \quad (20)$$

As above, since the digital modulation components are cancelled out, after the dc components of the equation (20) are cut, the resultant signal is amplified to recover the input signal υm(t) before the modulation by the AM data modulator 1. It can be therefore understood that an AM sync detection output is not affected even if an AM data multiplexing modulation signal modulated by the AM data multiplexing modulation apparatus of the second modification of the embodiment of the invention is AM sync detected.

Next, an AM data multiplexing modulation apparatus according to a third modification of the embodiment of the invention will be described.

Figure 5:
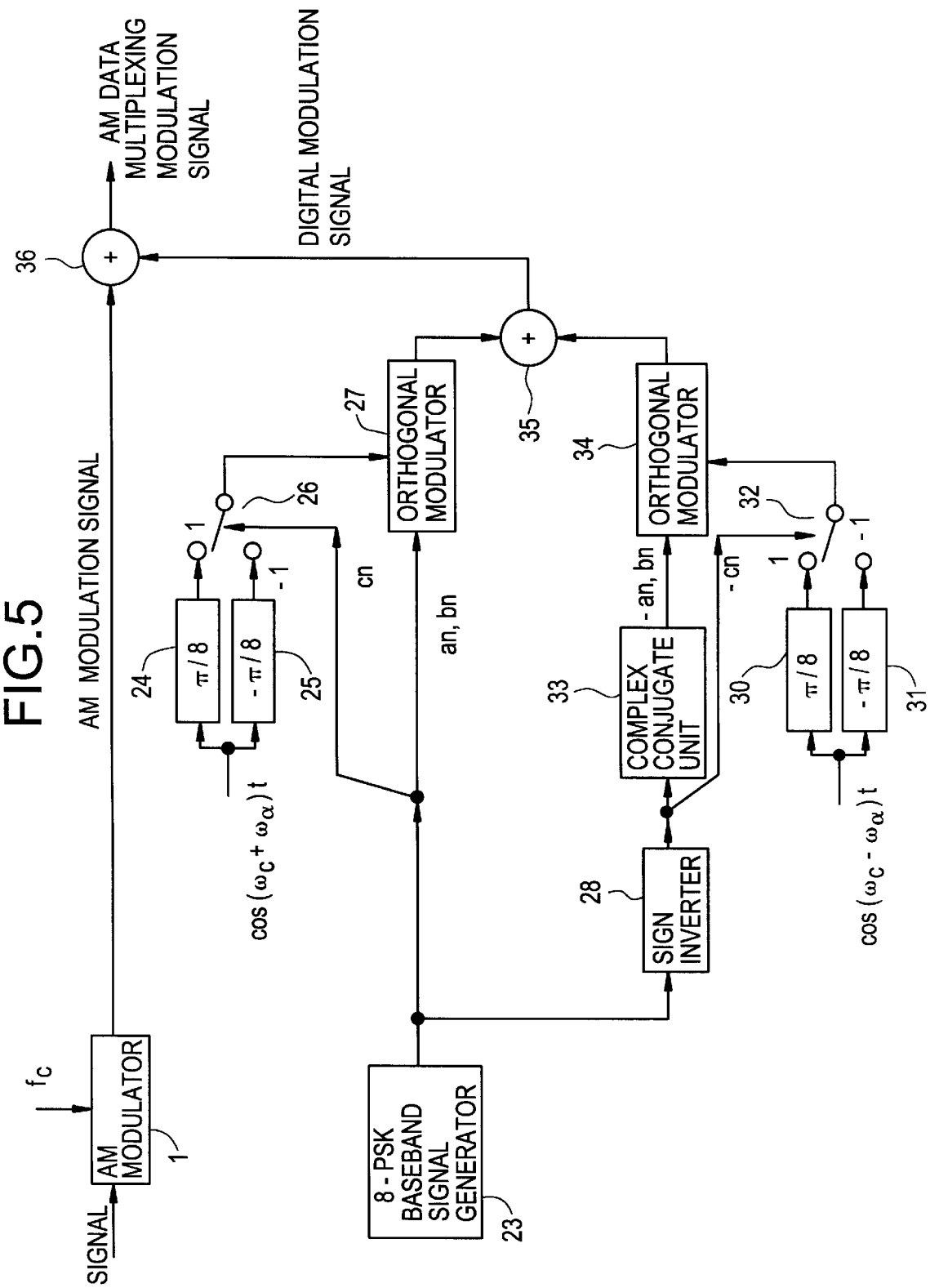
FIG. 5 is a block diagram showing the structure of an AM data multiplexing modulation apparatus according to a third modification of the embodiment of the invention.

FIG. 5 is a block diagram showing the structure of an AM data multiplexing modulation apparatus according to the third modification of the embodiment of the invention. The AM data multiplexing modulation apparatus of the third modification of the embodiment of this invention shown in FIG. 5 is one example wherein an 8-phase PSK modulation is used as digital modulation.

In the AM data multiplexing modulation apparatus of the third modification, an analog signal is supplied to an AM modulator 1 to AM modulate a carrier having a frequency fc by the analog signal. The initial phase of a carrier cos (ωc+ωα)t is shifted by (+π/8) radian by a phase shifter 24 and by (−π/8) radian by a phase shifter 25. In accordance with the phase of a PSK baseband digital signal (cn) among PSK baseband digital signals (an, bn, cn) generated by an 8-phase PSK baseband digital signal generator 23, one of the carriers output from the phase shifters 24 and 25 is selected. The selected carrier and a dibit (an, bn) of the PSK baseband digital signals are supplied to an orthogonal modulator 27 which orthogonally modulates the selected carrier cos (ωc+ωα) by the dibit (an, bn). Reference numeral 26 represents a switch for selecting one of the carriers output from the phase shifters 24 and 25 in accordance with the phase of the PSK baseband digital signal (cn).

The sign of the 8-phase PSK baseband digital signal generated by the 8-phase PSK baseband digital signal generator 23 is inverted by a sign inverter 28. A dibit (−an, −bn) in a tribit of 8-phase PSK baseband signals (−an, −bn, −cn) whose signs were inverted by the sign inverter 28, is supplied to a complex conjugate unit 33 to be converted into a dibit (−an, bn).

The initial phase of a carrier cos (ωc−ωα)t is shifted by (+π/8) radian by a phase shifter 30 and by (−π/8) radian by a phase shifter 31. In accordance with the phase of the PSK baseband digital signal (−cn) among the 8-phase PSK baseband digital signals (−an, −bn, −cn) whose signs were inverted by the sign inverter 28, one of the carriers output from the phase shifters 30 and 31 is selected. The selected carrier and the dibit (−an, bn) output from the complex conjugate unit 33 are supplied to an orthogonal modulator 34 which orthogonally modulates the selected carrier cos (ωc−ωα) by the dibit (−an, bn). Reference numeral 32 represents a switch for selecting one of the carriers output from the phase shifters 30 and 31 in accordance with the phase of the PSK baseband digital signal (−cn).

An output signal from the orthogonal modulator 27 and an output signal from the orthogonal modulator 34 are supplied to an adder 35 and added together. An output signal from the adder 35 and an AM modulation signal from the AM modulator 1 are supplied to an adder 36 and added together. This addition signal from the adder 36 is transmitted as an AM data multiplexed modulation signal.

An AM data multiplexed modulation process to be executed by the AM data multiplexed modulation apparatus of the third modification of the embodiment of the invention constructed as above will be described.

The processes of generating an AM data multiplexed modulation signal by the AM data multiplexed modulation apparatus of the third modification of the embodiment of the invention shown in FIG. 5 will be described.

An AM modulation signal υAM(t) output from the AM modulator is given by the following equation (21), where the amplitude of the carrier is 1, an angular frequency of the carrier is ωc (rad/s), the modulation factor is κ, and the input signal is υm(t).

$$\upsilon AM(t) = \{1 + \kappa\upsilon m(t)\} \cos \omega c t \qquad (21)$$

A signal train generated by the 8-phase PSK baseband digital signal generator 23 is represented by an, bn, and cn which are given by:

an, bn, cn=+/−1

The tribit is divided into two circuit paths. The dibit (an, bn) of one tribit orthogonally modulates a carrier cos {(ωc+ωα)t+(π/8)cn} whose initial phase was selected by the switch 26 in accordance with the phase of the PSK baseband digital signal (cn). An output signal υDH(t) from the modulator 27 is given by the following equation (22).

$$\upsilon DH(t) = an \cos\{(\omega c + \omega\alpha)t + (\pi/8)cn\} + bn \sin\{(\omega c + \omega\alpha)t + (\pi/8)cn\} \qquad (22)$$

The other tribit (an, bn, cn) is converted by the sign converter 28 into (−an, −bn, −cn). The dibit (−an,−bn) of this tribit is input to the complex conjugate unit 33 and changed to a dibit (−an, bn) which orthogonally modulates a carrier cos {(ωc−ωα)t−(π/8)cn} whose initial phase was selected by the switch 32 in accordance with the phase of the PSK baseband digital signal (−cn). An output signal υDL(t) from the modulator 34 is given by the following equation (23).

$$\upsilon DL(t) = -an\cos\{(\omega c - \omega a)t - (\pi/8)cn\} + bn\sin\{(\omega c - \omega a)t - (\pi/8)cn\} \qquad (23)$$

The signals υDH(t) and υDL(t) are input to the adder 35 and added together. The addition output or digital modulation signal υD(t) is given by the following equation (24).

$$\begin{aligned}\upsilon D(t) &= \upsilon DH(t) + \upsilon DL(t) \qquad (24)\\ &= an\cos\{(\omega c + \omega a)t + (\pi/8)cn\} + \\ &\quad bn\sin\{(\omega c + \omega a)t + (\pi/8)cn\} - \\ &\quad an\cos\{(\omega c - \omega a)t - (\pi/8)cn\} + \\ &\quad bn\sin\{(\omega c - \omega a)t - (\pi/8)cn\}\end{aligned}$$

The AM modulated signal υAM (t) output from the AM modulator 1 and the digital modulated signal υD(t) are input to the adder 36 and added together. The AM data multiplexed modulation signal υ(t) is given by the following equation (25).

$$\begin{aligned}\upsilon(t) &= \upsilon AM(t) + \upsilon D(t) \qquad (25)\\ &= \{1 + \kappa\upsilon m(t)\}\cos\omega c t + \\ &\quad an\cos\{(\omega c + \omega a)t + (\pi/8)cn\} + \\ &\quad bn\sin\{(\omega c + \omega a)t + (\pi/8)cn\} - \\ &\quad an\cos\{(\omega c - \omega a)t - (\pi/8)cn\} + \\ &\quad bn\sin\{(\omega c - \omega a)t - (\pi/8)cn\}\end{aligned}$$

Next, an AM sync detection of the AM data multiplexing modulation signal (in the case of 8-phase PSK modulation) modulated in the above manner will be described.

For the AM sync detection of the AM data multiplexed modulation signal modulated by using 8-phase PSK modulation as the digital modulation, the AM carrier cos ωct is multiplied by the equation (25). The low-pass filer of the AM sync detector cuts the high frequency components and the result is given by:

$$\begin{aligned}2\{\upsilon(t)\cos\omega c t\} &= \{1 + \kappa\upsilon m(t)\} + \\ &\quad an\cos\{\omega a t + (\pi/8)cn\} + \\ &\quad bn\sin\{\omega a t + (\pi/8)cn\} - \\ &\quad an\cos\{-\omega a t - (\pi/8)cn\} + \\ &\quad bn\sin\{-\omega a t - (\pi/8)cn\}\end{aligned}$$

By properly arranging the above equation, the following equation (26) is obtained.

$$\begin{aligned}2\{\upsilon(t)\cos\omega c t\} &= \{1 + \kappa\upsilon m(t)\} + \qquad (26)\\ &\quad an\cos\{\omega a t + (\pi/8)cn\} + \\ &\quad bn\sin\{\omega a t + (\pi/8)cn\} - \\ &\quad an\cos\{\omega a t + (\pi/8)cn\} - \\ &\quad bn\sin\{\omega a t + (\pi/8)cn\}\\ &= 1 + \kappa\upsilon m(t)\end{aligned}$$

As above, since the digital modulation components are cancelled out, after the dc components of the equation (26) are cut, the resultant signal is amplified to recover the input signal υm(t) before the modulation by the AM data modulator 1. It can be therefore understood that an AM sync detection output is not affected even if an AM data multiplexing modulation signal modulated by the AM data multiplexing modulation apparatus of the third modification of the embodiment of the invention is AM sync detected.

Next, an AM data multiplexing modulation apparatus according to a fourth modification of the embodiment of the invention will be described.

Figure 6:
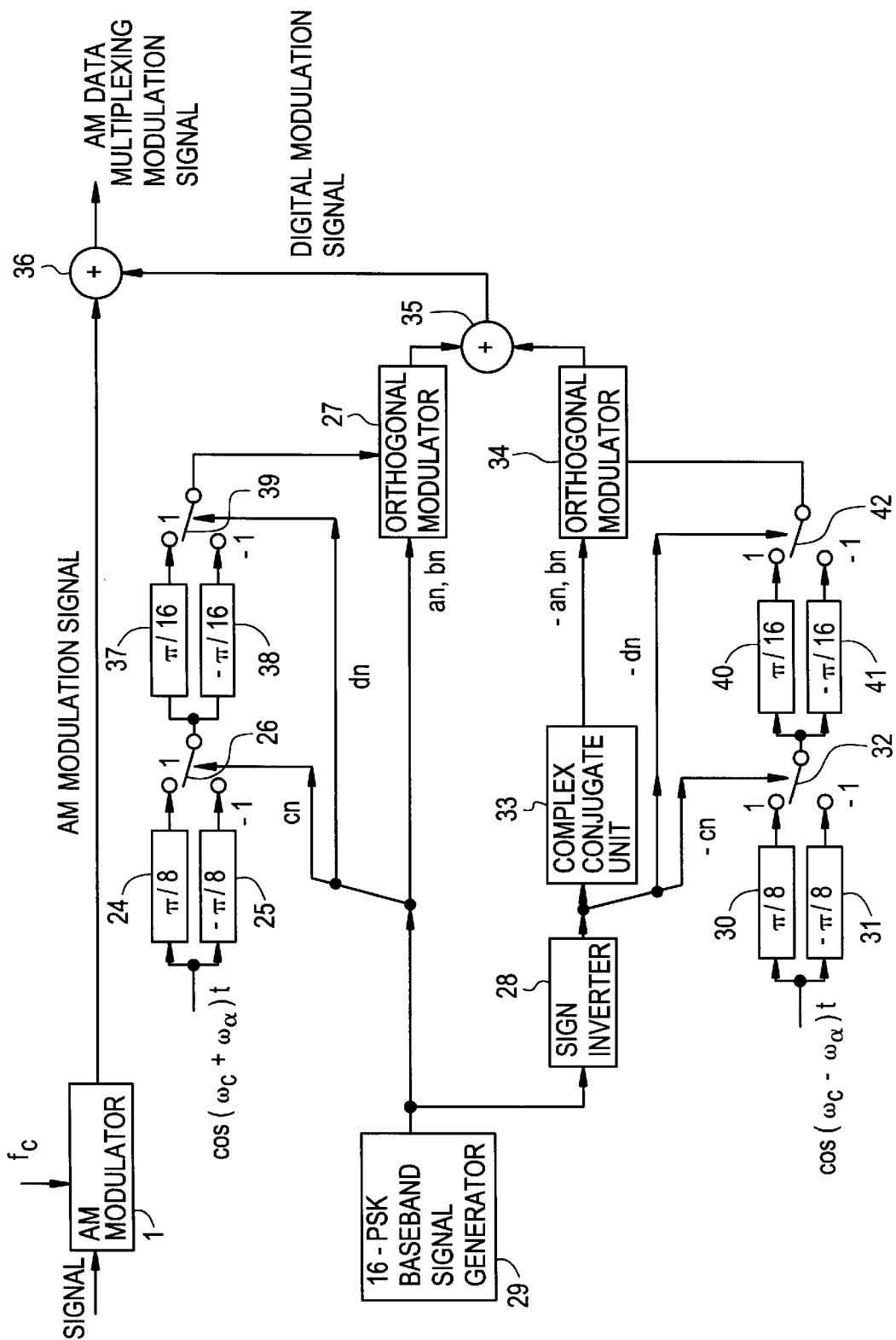
FIG. 6 is a block diagram showing the structure of an AM data multiplexing modulation apparatus according to a fourth modification of the embodiment of the invention.

FIG. 6 is a block diagram showing the structure of an AM data multiplexing modulation apparatus according to the fourth modification of the embodiment of the invention. The AM data multiplexing modulation apparatus of the fourth modification of the embodiment of this invention shown in FIG. 6 is one example wherein an 16-phase PSK modulation is used as digital modulation.

In the AM data multiplexing modulation apparatus of the fourth modification, an analog signal is supplied to an AM modulator 1 to AM modulate a carrier having a frequency fc by the analog signal. The initial phase of a carrier cos (ωc+ωα)t is shifted by (+π/8) radian by a phase shifter 24 and by ($-\pi/8$) radian by a phase shifter 25. In accordance with the phase of a PSK baseband digital signal (cn) among PSK baseband digital signals (an, bn, cn, dn) generated by a 16-phase PSK baseband digital signal generator 29, one of the carriers output from the phase shifters 24 and 25 is selected. The phase of the selected carrier is shifted by ($+\pi/16$) radian by a phase shifter 37 and by ($-\pi/16$) radian by a phase shifter 38. In accordance with the phase of the PSK baseband digital signal (dn) among the PSK baseband digital signals (an, bn, cn, dn) generated by the 16-phase PSK baseband digital signal generator 29, one of the carriers output from the phase shifters 37 and 38 is selected.

The selected one of the carriers from the phase shifters 37 and 38 and a dibit (an, bn) of the PSK baseband digital signals (an, bn, cn, dn) are supplied to an orthogonal modulator 27 which orthogonally modulates the selected carrier cos ($\omega c + \omega \alpha$) by the dibit (an, bn). Reference numeral 26 represents a switch for selecting one of the carriers output from the phase shifters 24 and 25 in accordance with the phase of the PSK baseband digital signal (cn). Reference numeral 39 represents a switch for selecting one of the carriers output from the phase shifters 37 and 38 in accordance with the phase of the PSK baseband digital signal (dn).

The sign of the 16-phase PSK baseband digital signal generated by the 16-phase PSK baseband digital signal generator 29 is inverted by a sign inverter 28. A dibit (–an, –bn) of the 16-phase PSK baseband signals (–an, –bn, –cn, –dn) whose signs were inverted by the sign inverter 28, is supplied to a complex conjugate unit 33 to be converted into a dibit (–an, bn).

The initial phase of a carrier cos ($\omega c - \omega \alpha$)t is shifted by ($+\pi/8$) radian by a phase shifter 30 and by ($-\pi/8$) radian by a phase shifter 31. In accordance with the phase of the PSK baseband digital signal (–cn) among the 16-phase PSK baseband digital signals (–an, –bn, –cn, –dn) whose signs were inverted by the sign inverter 28, one of the carriers output from the phase shifters 30 and 31 is selected. The phase of the selected carrier is shifted by ($+\pi/16$) radian by a phase shifter 40 and by ($-\pi/16$) radian by a phase shifter 41. In accordance with the phase of the PSK baseband digital signal (–dn) among the PSK baseband digital signals (–an, –bn, –cn, –dn) whose signs were inverted by the sign inverter 28, one of the carriers output from the phase shifters 40 and 41 is selected.

The selected one of the carriers from the phase shifters 40 and 41 and a dibit (–an, bn) of the PSK baseband digital signals (–an, –bn, –cn, –dn) are supplied to an orthogonal modulator 34 which orthogonally modulates the selected carrier cos ($\omega c - \omega \alpha$) by the dibit (–an, bn). Reference numeral 32 represents a switch for selecting one of the carriers output from the phase shifters 30 and 31 in accordance with the phase of the PSK baseband digital signal (–cn). Reference numeral 42 represents a switch for selecting one of the carriers output from the phase shifters 40 and 41 in accordance with the phase of the PSK baseband digital signal (–dn).

An output signal from the orthogonal modulator 27 and an output signal from the orthogonal modulator 34 are supplied to an adder 35 and added together. An output signal from the adder 35 and an AM modulation signal from the AM modulator 1 are supplied to an adder 36 and added together. This addition signal from the adder 36 is transmitted as an AM data multiplexed modulation signal.

An AM data multiplexed modulation process to be executed by the AM data multiplexed modulation apparatus of the fourth modification of the embodiment of the invention constructed as above will be described.

The processes of generating an AM data multiplexed modulation signal by the AM data multiplexed modulation apparatus of the fourth modification of the embodiment of the invention shown in FIG. 6 will be described.

An AM modulation signal $\upsilon AM(t)$ output from the AM modulator is given by the following equation (27), where the amplitude of the carrier is 1, an angular frequency of the carrier is $\omega c$ (rad/s), the modulation factor is $\kappa$, and the input signal is $\upsilon m(t)$.

$$\upsilon AM(t) = \{1 + \kappa \upsilon m(t)\} \cos \omega c t \qquad (27)$$

A signal train generated by the 16-phase PSK baseband digital signal generator 29 is represented by an, bn, cn, and dn which are given by:

an, bn, cn, dn = +/–1

This PSK baseband digital signal (an, bn, cn, dn) is supplied to two circuit paths. The dibit (an, bn) of the PSK baseband digital signal (an, bn, cn, dn) orthogonally modulates a carrier cos $\{(\omega c + \omega \alpha)t + (\pi/8)cn + (\pi/16)dn\}$ whose phase was selected by the switches 26 and 39 in accordance with the phase of the PSK baseband digital signals (cn) and (dn). An output signal $\upsilon DH(t)$ is given by the following equation (28).

$$\upsilon DH(t) = an \cos \{(\omega c + \omega \alpha)t + (\pi/8)cn + (\pi/16)dn\} + bn \sin \{(\omega c + \omega \alpha)t + (\pi/8)cn + (\pi/16)dn\} \qquad (28)$$

The other PSK baseband digital signal (an, bn, cn, dn) is converted by the sign converter 28 into (–an, –bn, –cn, –dn). The dibit (–an,–bn) thereof is input to the complex conjugate unit 33 and changed to a dibit (–an, bn) which orthogonally modulates a carrier cos $\{(\omega c - \omega \alpha)t - (\pi/8)cn - (\pi/16)dn\}$ whose phase was selected by the switches 32 and 42 in accordance with the phase of the PSK baseband digital signals (–cn) and (–dn). An output signal $\upsilon DL(t)$ is given by the following equation (29).

$$\upsilon DL(t) = -an \cos \{(\omega c - \omega \alpha)t - (\pi/8)cn + (\pi/16)dn\} + bn \sin \{(\omega c - \omega \alpha)t + (\pi/8)cn - (\pi/16)dn\} \qquad (29)$$

The signals $\upsilon DH(t)$ and $\upsilon DL(t)$ are input to the adder 35 and added together. The addition output or digital modulation signal $\upsilon D(t)$ is given by the following equation (30).

$$\begin{aligned}\upsilon D(t) &= \upsilon DH(t) + \upsilon DL(t) \\ &= \underline{an}\cos\{(\omega c + \omega \alpha)t + (\pi/8)\underline{cn} + (\pi/16)\underline{dn}\} + \\ &\quad \underline{bn}\sin\{(\omega c + \omega \alpha)t + (\pi/8)\underline{cn} + (\pi/16)\underline{dn}\} - \\ &\quad \underline{an}\cos\{(\omega c - \omega \alpha)t - (\pi/8)\underline{cn} - (\pi/16)\underline{dn}\} + \\ &\quad \underline{bn}\sin\{(\omega c - \omega \alpha)t - (\pi/8)\underline{cn} - (\pi/16)\underline{dn}\}\end{aligned} \qquad (30)$$

The AM modulated signal $\upsilon AM(t)$ output from the AM modulator 1 and the digital modulated signal $\upsilon D(t)$ are input to the adder 36 and added together. The AM data multiplexed modulation signal $\upsilon(t)$ output from the adder is given by the following equation (31).

$$v(t) = vAM(t) + vD(t) \quad (31)$$

$$= \{1 + \kappa v m(t)\}\cos\omega ct +$$

$$\underline{an}\cos\{(\omega c + \omega\alpha)t + (\pi/8)\underline{cn} + (\pi/16)\underline{dn}\} +$$

$$\underline{bn}\sin\{(\omega c + \omega\alpha)t + (\pi/8)\underline{cn} + (\pi/16)\underline{dn}\} -$$

$$\underline{an}\cos\{(\omega c - \omega\alpha)t - (\pi/8)\underline{cn} - (\pi/16)\underline{dn}\} +$$

$$\underline{bn}\sin\{(\omega c - \omega\alpha)t - (\pi/8)\underline{cn} - (\pi/16)\underline{dn}\}$$

Next, an AM sync detection of the AM data multiplexing modulation signal (in the case of 16-phase PSK modulation) modulated in the above manner will be described.

For the AM sync detection of the AM data multiplexed modulation signal modulated by using 16-phase PSK modulation as the digital modulation, the AM carrier cos ωct is multiplied by the equation (31). The low-pass filer of the AM sync detector cuts the high frequency components and the result is given by:

$$2\{v(t)\cos\omega ct\} = \{1 + \kappa v m(t)\} +$$

$$\underline{an}\cos\{\omega\alpha t + (\pi/8)\underline{cn} + (\pi/16)\underline{dn}\} +$$

$$\underline{bn}\sin\{\omega\alpha t + (\pi/8)\underline{cn} + (\pi/16)\underline{dn}\} -$$

$$\underline{an}\cos\{-\omega\alpha t - (\pi/8)\underline{cn} - (\pi/16)\underline{dn}\} +$$

$$\underline{bn}\sin\{-\omega\alpha t - (\pi/8)\underline{cn} - (\pi/16)\underline{dn}\}$$

By properly arranging the above equation, the following equation (32) is obtained.

$$2\{v(t)\cos\omega ct\} = \{1 + \kappa v m(t)\} + \quad (32)$$

$$\underline{an}\cos\{\omega\alpha t + (\pi/8)\underline{cn} + (\pi/16)\underline{dn}\} +$$

$$\underline{bn}\sin\{\omega\alpha t + (\pi/8)\underline{cn} + (\pi/16)\underline{dn}\} -$$

$$\underline{an}\cos\{\omega\alpha t + (\pi/8)\underline{cn} + (\pi/16)\underline{dn}\} -$$

$$\underline{bn}\sin\{\omega\alpha t + (\pi/8)\underline{cn} + (\pi/16)\underline{dn}\}$$

$$= 1 + \kappa v m(t)$$

As above, since the digital modulation components are cancelled out, after the dc components of the equation (32) are cut, the resultant signal is amplified to recover the input signal υm(t) before the modulation by the AM data modulator 1. It can be therefore understood that an AM sync detection output is not affected even if an AM data multiplexing modulation signal modulated by the AM data multiplexing modulation apparatus of the third modification of the embodiment of the invention is AM sync detected.

Next, an AM data multiplexing modulation apparatus according to a fifth modification of the embodiment of the invention will be described.

FIG. 7 is a block diagram showing the structure of an AM data multiplexing modulation apparatus according to the fifth modification of the embodiment of the invention. The AM data multiplexing modulation apparatus of the fourth modification of the embodiment of this invention shown in FIG. 7 is one example wherein a 4-phase PSK modulation with multi-carrier is used as digital modulation.

In the AM data multiplexing modulation apparatus of the fifth modification, an analog signal is supplied to an AM modulator 1 to AM modulate a carrier having a frequency fc by the analog signal. A 4-phase PSK baseband digital signal (I1n, Q1n, I2n, Q2n) is supplied to two circuit paths. A 4-phase PSK baseband digital signal (I1n, Q1n) and a carrier cos (ωc−ωα) are supplied to an orthogonal modulator 44 which orthogonally modulates the carrier cos (ωc+ωα) by the 4-phase PSK baseband digital signal (I1n, Q1n). Similarly, a 4-phase PSK baseband digital signal (I2n, Q2n) and a carrier cos (ωc+ωα) are supplied to an orthogonal modulator 45 which orthogonally modulates the carrier cos (ωc+ωβ) by the 4-phase PSK baseband digital signal (I2n, Q2n).

The 4-phase PSK baseband digital signal (I1n, Q1n, I2n, Q2n) generated by the 4-phase PSK baseband digital signal generator 43 is supplied to a sign inverter 46 to invert the signs of the signal to obtain a 4-phase PSK baseband digital signal (−I1n, −Q1n, −I2n, −Q2n). The sign converted 4-phase PSK baseband digital signal (−I1n, −Q1n, −I2n, −Q2n) is supplied to a complex conjugate unit 47 to covert it into a 4-phase PSK baseband digital signal (−I1n, Q1n, −I2n, Q2n).

Of the 4-phase PSK baseband digital signal (−I1n, Q1n, −I2n, Q2n), two 4-phase PSK baseband digital signals (−I1n, Q1n) and (−I2n, Q2n) are separately supplied to the next stage. The 4-phase PSK baseband digital signal (−I1n, Q1n) and a carrier cos (ωc−ωα) are supplied to an orthogonal modulator 48 which orthogonally modulates the carrier cos (ωc−ωα) by the 4-phase PSK baseband digital signal (−I1n, Q1n). Similarly, the 4-phase PSK baseband digital signal (−I2n, Q2n) and a carrier cos (ωc−ωβ) are supplied to an orthogonal modulator 45 which orthogonally modulates the carrier cos (ωc−ωβ) by the 4-phase PSK baseband digital signal (−I2n, Q2n).

Output signals from the orthogonal modulators 44, 45, 48 and 49 are supplied to an adder 50 and added together. An output signal from the adder 50 and an AM modulation signal from the AM modulator 1 are supplied to an adder 51 and added together. This addition signal from the adder 51 is transmitted as an AM data multiplexed modulation signal.

An AM data multiplexed modulation process to be executed by the AM data multiplexed modulation apparatus of the fifth modification of the embodiment of the invention constructed as above will be described.

The processes of generating an AM data multiplexed modulation signal by the AM data multiplexed modulation apparatus of the fifth modification of the embodiment of the invention shown in FIG. 7 will be described.

An AM modulation signal υAM(t) output from the AM modulator is given by the following equation (33), where the amplitude of the carrier is 1, an angular frequency of the carrier is ωc (rad/s), the modulation factor is κ, and the input signal is υm(t).

$$vAM(t) = \{1 + \kappa v m(t)\} \cos \omega ct \quad (33)$$

A PSK baseband digital signal generated by the 4-phase PSK baseband digital signal generator 43 is represented by I1n, Q1n, I2n and Q2n which are given by:

I1n, Q1n, I2n, Q2n=+/−1

The PSK baseband digital signals (I1n, Q1n) and (I2n, Q2n) and the carriers cos (ωc+ωα) and cos (ωc+ωβ) are supplied to the orthogonal modulators 44 and 45 which orthogonally modulate the carriers. A total output signal υDH(t) is given by the following equation (34).

$$vDH(t) = I1n \cos(\omega c + \omega\alpha)t + Q1n \sin(\omega c + \omega\alpha)t + I2n \cos(\omega c + \omega\beta)t + Q2n \sin(\omega c + \omega\beta)t \quad (34)$$

The PSK baseband digital signal (I1n, Q1n, I2n, Q2n) is converted by the sign inverter 46 into a PSK baseband digital signal (−I1n, −Q1n, −I2n, −Q2n). This converted signal is changed by the complex conjugate unit to a PSK baseband digital signal ($-I1n$, $Q1n$, $-I2n$, $Q2n$). The PSK baseband digital signals ($-I1n$, $Q1n$) and ($-I2n$, $Q2n$) and the carriers $\cos(\omega c-\omega\alpha)$ and $\cos(\omega c-\omega\beta)$ are supplied to the orthogonal modulators 48 and 49 which orthogonally modulate the carriers. A total output signal $vDL(t)$ is given by the following equation (35).

$$vDL(t)=-I1n\cos(\omega c-\omega\alpha)t+Q1n\sin(\omega c-\omega\alpha)t-I2n\cos(\omega c-\omega\beta)t+Q2n\sin(\omega c-\omega\beta)t \tag{35}$$

The signals $vDH(t)$ and $vDL(t)$ are input to the adder 50 and added together. The addition output or digital modulation signal $vD(t)$ is given by the following equation (36).

$$\begin{aligned}vD(t) &= vDH(t)+vDL(t) \\ &= I1n\cos(\omega c+\omega\alpha)t+Q1n\sin(\omega c+\omega\alpha)t+ \\ &\quad I2n\cos(\omega c+\omega\beta)t+Q2n\sin(\omega c+\omega\beta)t- \\ &\quad I1n\cos(\omega c-\omega\alpha)t+Q1n\sin(\omega c-\omega\alpha)t- \\ &\quad I2n\cos(\omega c-\omega\beta)t+Q2n\sin(\omega c-\omega\beta)t\end{aligned} \tag{36}$$

The AM modulated signal $vAM(t)$ and the digital modulated signal $vD(t)$ are input to the adder 51 and added together. The AM data multiplexed modulation signal $v(t)$ output from the adder 51 is given by the following equation (37).

$$\begin{aligned}v(t) &= vAM(t)+vD(t) \\ &= \{1+\kappa vm(t)\}\cos\omega ct+ \\ &\quad I1n\cos(\omega c+\omega\alpha)t+Q1n\sin(\omega c+\omega\alpha)t+ \\ &\quad I2n\cos(\omega c+\omega\beta)t+Q2n\sin(\omega c+\omega\beta)t- \\ &\quad I1n\cos(\omega c-\omega\alpha)t+Q1n\sin(\omega c-\omega\alpha)t- \\ &\quad I2n\cos(\omega c-\omega\beta)t+Q2n\sin(\omega c-\omega\beta)t\end{aligned} \tag{37}$$

Next, an AM sync detection of the AM data multiplexing modulation signal (in the case of 4-phase PSK modulation with multi-carrier) modulated in the above manner will be described.

For the AM sync detection of the AM data multiplexed modulation signal modulated by using 4-phase PSK modulation with multi-carrier as the digital modulation, the AM carrier $\cos \omega ct$ is multiplied by the equation (37). The low-pass filer of the AM sync detector cuts the high frequency components and the result is given by:

$$\begin{aligned}2\{v(t)\cos\omega ct\} &= \{1+\kappa vm(t)\}+I1n\cos\omega\alpha t+Q1n\sin\omega\alpha t+ \\ &\quad I2n\cos\omega\beta t+Q2n\sin\omega\beta t-I1n\cos(-\omega\alpha)t+ \\ &\quad Q1n\sin(-\omega\alpha)t-I2n\cos(-\omega\beta)t+Q2n\sin(-\omega\beta)t\end{aligned}$$

By properly arranging the above equation, the following equation (38) is obtained.

$$\begin{aligned}2\{v(t)\cos\omega ct\} &= \{1+\kappa vm(t)\}+ \\ &\quad I1n\cos\omega\alpha t+Q1n\sin\omega\alpha t+I2n\cos\omega\beta t+ \\ &\quad Q2n\sin\omega\beta t-I1n\cos\omega\alpha t-Q1n\sin\omega\alpha t- \\ &\quad I2n\cos\omega\beta t-Q2n\sin\omega\beta t \\ &= 1+\kappa vm(t)\end{aligned} \tag{38}$$

As above, since the digital modulation components are cancelled out, after the dc components of the equation (38) are cut, the resultant signal is amplified to recover the input signal $vm(t)$ before the modulation by the AM data modulator 1. It can be therefore understood that an AM sync detection output is not affected even if an AM data multiplexing modulation signal modulated by the AM data multiplexing modulation apparatus of the third modification of the embodiment of the invention is AM sync detected.

As described so far, according to the AM data multiplexing modulation apparatus of this invention, the digital modulation signals are multiplexed symmetrically with an AM carrier along the frequency axis. Therefore, an AM sync detection output is not affected even if an AM data multiplexing modulation signal is AM sync detected.

What is claimed is:

1. An AM data multiplexing modulation apparatus comprising:

an AM modulator for AM modulating a carrier having a frequency of fc by an analog signal;

a first modulator for modulating a carrier having a frequency of (fc+fα) by a baseband digital signal generated by a baseband digital signal generator;

a sign inverter for inverting a sign of the baseband digital signal generated by the baseband digital signal generator;

a second modulator for modulating a carrier having a frequency of (fc−fα) by an output signal from said sign inverter;

a first adder for adding an output signal from said first modulator to an output signal from said second modulator; and a second adder for adding an output signal from said AM modulator to an output signal from said first adder.

2. An AM data multiplexing modulation apparatus comprising:

an AM modulator for AM modulating a carrier having a frequency of fc by an analog signal;

a first balanced modulator for modulating a carrier having a frequency of (fc+fα) by an ASK baseband digital signal generated by an ASK baseband digital signal generator;

a sign inverter for inverting a sign of the ASK baseband digital signal generated by the ASK baseband digital signal generator;

a second balanced modulator for modulating a carrier having a frequency of (fc−fα) by an output signal from said sign inverter;

a first adder for adding an output signal from said first balanced modulator to an output signal from said second balanced modulator; and a second adder for adding an output signal from said AM modulator to an output signal from said first adder.

3. An AM data multiplexing modulation apparatus comprising:

an AM modulator for AM modulating a carrier having a frequency of fc by an analog signal;

a first orthogonal modulator for orthogonally modulating a carrier having a frequency of (fc+fα) by a four-phase PSK baseband digital signal generated by a four-phase PSK baseband digital signal generator;

a sign inverter for inverting the sign of a signal having the same phase as a reference carrier phase of vector shift and corresponding to a dibit formed by the four-phase PSK baseband digital signal generated by the four-phase PSK baseband digital signal generator;

a second orthogonal modulator for orthogonally modulating a carrier having a frequency of (fc−fα) by an output signal from said sign inverter;

a first adder for adding an output signal from said first orthogonal modulator to an output signal from said second orthogonal modulator; and a second adder for adding an output signal from said AM modulator to an output signal from said first adder.

4. An AM data multiplexing modulation apparatus comprising:

an AM modulator for AM modulating a carrier having a frequency of fc by an analog signal;

a first modulator for orthogonally modulating a carrier having a frequency of (fc+fα) by 2 bits (an, bn) of a multi-phase (8-phase or more) PSK baseband digital signal (an, bn, cn, dn, . . . ) generated by a multi-phase PSK baseband digital signal generator, the phase of the carrier being controlled in accordance with a baseband digital signal (cn, dn, . . . ) of the third and higher bits of the multi-phase PSK baseband digital signal;

a sign inverter for inverting the sign of the multi-phase PSK baseband digital signal (an, bn, cn, dn, . . . ) generated by the multi-phase PSK baseband digital signal generator;

a complex conjugate unit for changing a dibit (−an, −bn) of two bits of the multi-phase PSK baseband digital signal with the sign thereof being inverted by said sign inverter, to a complex conjugate digital signal (−an, bn);

a second modulator for orthogonally modulating a carrier having a frequency of (fc−fα) by the complex conjugate digital signal (−an, bn) changed by said complex conjugate unit, the phase of the carrier being controlled in accordance with a baseband digital signal (−cn, −dn, . . . ) of the third and higher bits of the multi-phase PSK baseband digital signal with the sign thereof being inverted by said sign inverter;

a first adder for adding an output signal from said first modulator to an output signal from said second modulator; and a second adder for adding an output signal from said AM modulator to an output signal from said first adder.

5. An AM data multiplexing modulation apparatus comprising:

an AM modulator for AM modulating a carrier having a frequency of fc by an analog signal;

a first modulator for FSK modulating a carrier having a frequency of (fc+fα+Δf) and a carrier having a frequency of (fc+fα−Δf) by an FSK baseband digital signal generated by an FSK baseband digital signal generator;

a sign inverter for inverting the sign of the FSK baseband digital signal generated by the FSK baseband digital signal generator;

a second modulator for FSK modulating a carrier having a frequency of (fc−fα+Δf) and a carrier having a frequency of (fc−fα−Δf) by an output from said sign inverter;

a first adder for adding an output signal from said first modulator to an output signal from said second modulator; and a second adder for adding an output signal from said AM modulator to an output signal from said first adder.

6. An AM data multiplexing modulation apparatus comprising:

an AM modulator for AM modulating a carrier having a frequency of fc by an analog signal;

a first orthogonal modulator for orthogonally modulating carriers having frequencies of (fc+fn), where n is a natural number, by a four-phase PSK baseband digital signal generated by a four-phase PSK baseband digital signal generator;

a sign inverter for inverting the sign of a signal having the same phase as a reference carrier phase of vector shift and corresponding to a dibit formed by the four-phase PSK baseband digital signal generated by the four-phase PSK baseband digital signal generator;

a second orthogonal modulator for orthogonally modulating carriers having frequencies of (fc−fn), where n is a natural number, by an output from said sign inverter;

a first adder for adding an output signal from said first orthogonal modulator to an output signal from said second orthogonal modulator; and a second adder for adding an output signal from said AM modulator to an output signal from said first adder.

* * * * *